UNITED STATES PATENT OFFICE.

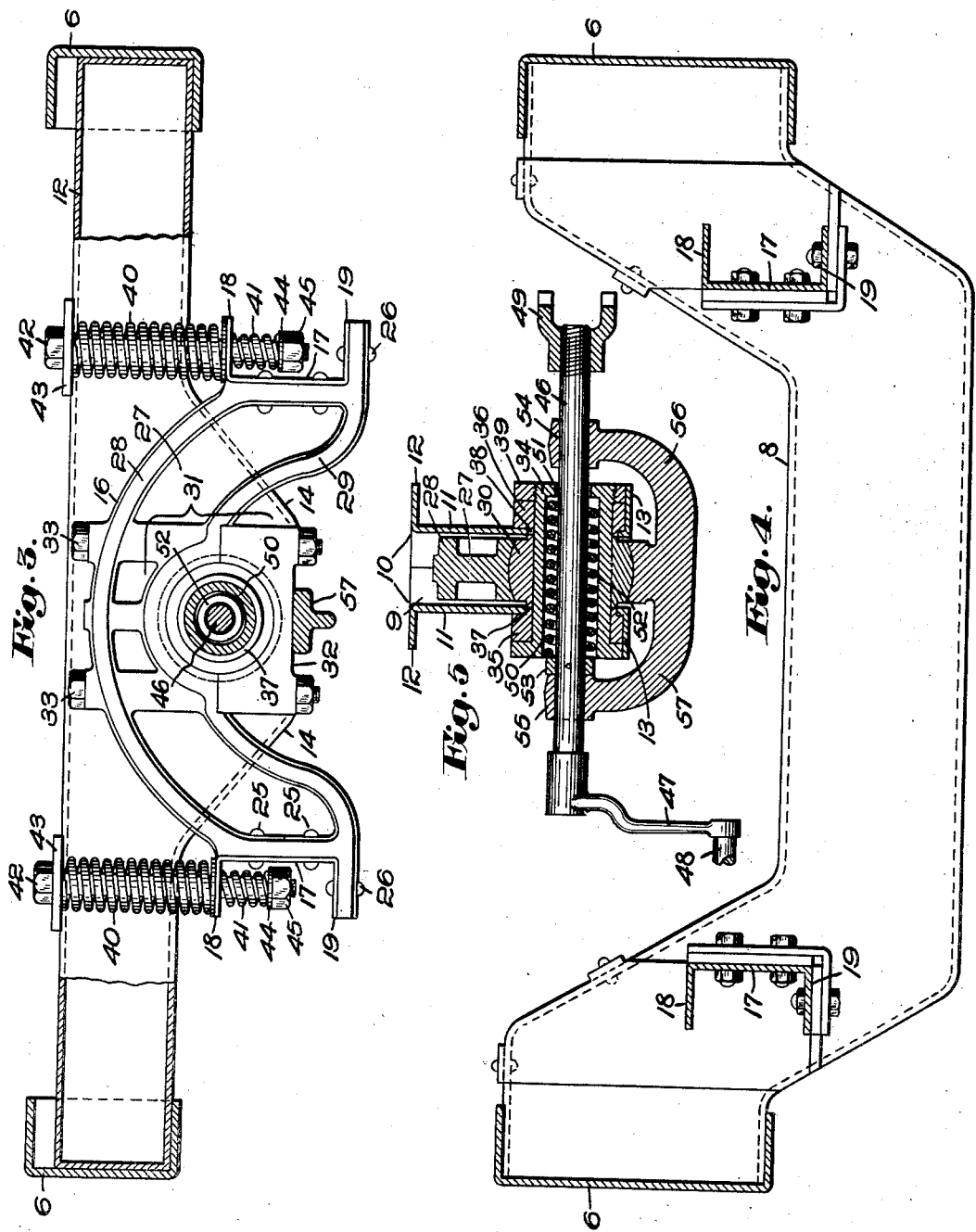

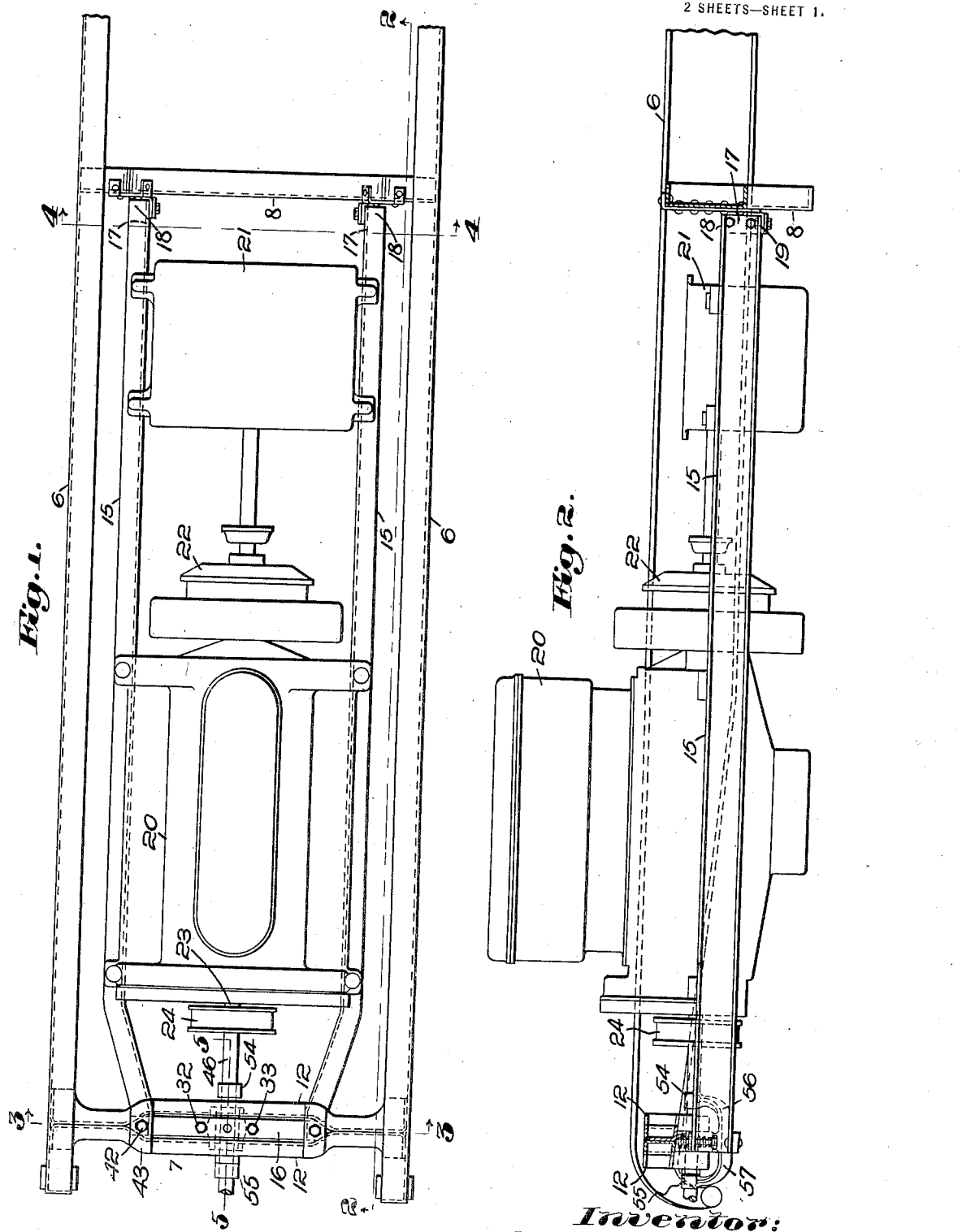

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

MOTOR-VEHICLE.

1,358,670.  
Specification of Letters Patent. Patented Nov. 9, 1920.

Application filed March 1, 1918. Serial No. 219,759.

*To all whom it may concern:*

Be it known that I, FRANS G. ALBORN, a citizen of the United States, and a resident of Milford, New Haven county, Connecticut, have invented an Improvement in Motor-Vehicles, of which the following description, in connection with the accompanying drawings, is a specification, like characters on the drawings representing like parts.

This invention relates to motor vehicles of the class in which the power plant, or at least the motor, is flexibly mounted on the main frame, usually at three points of support, and is more particularly concerned with means for compelling the motor starting crank to remain substantially alined with the crank-shaft of the motor. Even in motor vehicles of the class in which the frame is supposed to be rigid and the motor rigidly mounted thereon, it is often found that, when the vehicle is standing on uneven ground, there is so much distortion between the motor and the frame, that it is impossible to engage the clutch member of the motor starting crank with the mating clutch member on the end of the motor crank-shaft, it being understood, of course, that in vehicles of this class, the starting crank is mounted on the main frame independently of the motor. My invention is equally well adapted to motor vehicles of the class to which I have just referred, as well as to those in which special provision is made for flexible mounting of the motor on the main frame. My invention is more especially adapted for use in motor trucks of the class in which the motor and sometimes the transmission also is mounted on a sub-frame, which, in turn, is flexibly mounted on the main frame.

My invention will be best understood by reference to the following description, when taken in connection with the accompanying drawings of one specific embodiment thereof, while its scope will be more particularly pointed out in the appended claims.

In the drawings:

Figure 1 is a plan of the main frame, sub-frame, power plant, and motor-starting crank, of a vehicle embodying my invention;

Fig. 2 is a sectional view on line 2—2 of Fig. 1;

Fig. 3 is a sectional view, partly in elevation, on line 3—3 of Fig. 1;

Fig. 4 is a sectional view, on line 4—4, of Fig. 1; and

Fig. 5 is a sectional view on line 5—5 of Fig. 1.

Referring to the drawings, and to the embodiment of my invention which I have selected for illustration, I have shown a portion of a motor vehicle having a main frame, best shown in Figs. 1 and 2, comprising a pair of longitudinal members 6, a transverse front beam 7, and a transverse rear beam 8. The front beam herein shown is provided with a vertical opening 9, best shown in Fig. 5, formed by making said beam up of two members 10, consisting of channel bars having vertical webs 11, and upper and lower flanges 12 and 13. These channel bars are herein deepened at their central portion, as at 14, to form a convenient support for the forward end of the sub-frame now to be described.

Mounted on the main frame is a sub-frame comprising longitudinal members 15, and a transverse member 16, the latter being disposed in the vertical opening 9, as best shown in Figs. 3 and 5. The longitudinal members 16 herein consist of channel bars, having vertical webs 17, and upper and lower flanges 18 and 19. On these channel bars is supported a motor 20, and preferably also a transmission 21, which receives power from the motor through a clutch 22, all of which may be of any usual or desired type of construction. The motor herein is an internal combustion engine, having a usual crank-shaft 23, a portion of the forward end of which shows in Figs. 1 and 2. As herein shown, there is secured to the forward end of the crank-shaft a usual pulley 24, to drive the customary fan-belt and fan (not shown), usually employed as a part of the cooling system.

The transverse member 16 of the sub-frame herein is in the shape of an arch, whose ends are secured by rivets 25 and 26 to the web 17 and flange 19 of each of the longitudinal channel bars of the sub-frame. The transverse member 16 herein is in the form of an I-beam, having a web 27, and pairs of upper and lower flanges 28 and 29, the lower flanges being herein extended beneath the flanges 19 of the channel bars 15, as best shown in Fig. 3. The transverse bar 16 herein is supported on the transverse support 7, by a suitable ball and socket joint comprising a ball 30, and socket 31, the latter being formed in two parts, the upper of which is formed integral with the member 16, while the lower part consists of a cap 32, secured to the upper part by studs or bolts 33, extending through both parts. Thus it is evident that the ball and socket joint permits relative movement of the main and sub-frames about horizontal and vertical axes, and in this way prevents any distortion of the main frame from causing any distortion of the power plant.

The ball 30 is herein secured to the support 7, by providing a bushing 34, extending through said ball, as well as through the webs 11 of the channel bars 10. Collars 35 and 36, abutting against the outer faces of the webs 11, are provided with reduced portions 37 and 38, snugly fitting corresponding apertures in said webs. A nut 39, threaded onto the bushing 34, serves as a means for clamping the bushing, collars and ball, in place.

As a means for normally maintaining the front end of the sub-frame substantially parallel with the front end of the main frame, there are herein provided two pairs of upper and lower springs 40 and 41, encircling bolts 42, the latter extending through upper abutments 43 on the front support 7, and through the flanges 18 of the channel bars 15, as best shown in Fig. 3. Thus the flanges 18 constitute lower abutments for the springs 40, and upper abutments for the springs 41. The lower ends of the latter abut against washers 44, supported by nuts 45, threaded onto the bolts 42. It is evident that any tendency of the front end of the sub-frame to turn about the horizontal fore-and-aft axis of the ball and socket joint is yieldingly resisted by the springs 40 and 41.

The described motor vehicle is but one of many types, to which my invention which I shall now describe is applicable. The motor is herein provided with a common form of motor-starting crank 46, having at its front end a crank-arm 47, provided with a handle 48, and having at its rear end a clutch member 49, adapted for coöperation with a correspondingly formed mating clutch member (not shown), on the forward end of the motor crank-shaft 23. The construction and arrangement, and the mode of operation of these parts, are too well known to require further illustration or description. The starting-crank herein extends through an axial opening 50, provided in the bushing 34, and the latter is provided at its inner end with an abutment 51 for a usual spring 52, the other end of which bears against an abutment 53, carried by the crank 46. The arrangement is such that the spring normally maintains the starting-crank out of engagement with the crank-shaft, but such engagement may be effected for starting purposes by forcing the starting-crank inward against the tension of the spring, thereby to engage the coöperating clutches of the starting-crank and crank-shaft, whereupon the crank may be utilized to turn the crank-shaft.

It should now be evident from the foregoing that, if the starting-crank were supported in and carried by the bushing 34, relative distortion of the main and sub-frames would be bound to cause misalinement of the starting crank and crank-shaft. In fact, in the operation of many trucks, it has been found that, when the vehicle is standing on very uneven ground, the distortion is sufficient to make it altogether impossible to start the motor by the use of the starting-crank because of the misalinement to which I have just referred.

As a means to overcome this difficulty, I have herein provided suitable means, carried by the motor to maintain the starting-crank in alinement with the crank-shaft, regardless of any such distortion. In the present example, such means takes the form of two bearings 54 and 55, in which the starting-crank 46 is mounted, said bearings being carried by the sub-frame in any appropriate manner, as by providing the cap 32 with arms 56 and 57, best shown in Fig. 5, on which arms, the bearings 54 and 55 are formed. Thus it is apparent that, since the starting crank is carried by the sub-frame, it is compelled to follow the movements of the crank-shaft, and to remain in alinement therewith. It should be understood, of course, that a sufficiently large opening 50 is provided to permit freedom of action of the starting-crank therein.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. In a motor vehicle, the combination of a frame, a motor supported on said frame, a motor starting-crank, means including a starting-crank retracting spring connecting said starting-crank to said frame independently of said motor, and means carried by said motor to maintain said starting-crank in alinement with said motor.

2. In a motor vehicle, the combination of a frame, a motor supported on said frame, a motor starting-crank, a starting-crank retracting spring, means connecting said spring to said frame and including an abutment for the inner end of said spring, and means carried by said motor to compel the axis of said starting-crank to remain substantially alined with the axis of said motor despite relative displacement of said motor and frame.

3. In a motor vehicle, the combination of a frame, a motor, means flexibly connecting said motor to said frame, a motor starting-crank, starting-crank retracting means carried by said frame independently of said motor, and means carried by said motor in its movements relatively to said frame to compel said starting-crank to follow said movements.

4. In a motor vehicle, the combination of a frame, a motor, a universal joint flexibly connecting said motor to said frame, a motor starting-crank, starting-crank retracting means carried by said frame independently of said motor, and means carried by said motor in its movements relatively to said frame to compel said starting-crank to follow said movements.

5. In a motor vehicle, the combination of a frame, a motor, a universal joint flexibly connecting said motor to said frame, a motor starting-crank supported on said frame independently of said motor, and means governed by said motor in its movements relatively to said frame to compel said starting-crank to follow said movements.

6. In a motor vehicle, the combination of a frame, a motor supported on said frame, a motor starting-crank extending through a portion of said frame, and starting-crank bearings carried by said motor on opposite sides of such portion of said frame to cause said starting crank to move relatively to said frame and to remain alined with said motor despite relative displacement of said motor and said frame.

7. In a motor vehicle, the combination of a frame, a motor, a universal joint flexibly connecting said motor to said frame, a motor starting-crank, and starting-crank bearings carried by said motor on opposite sides of said universal joint to cause said starting-crank to move relatively to said frame and to remain alined with said motor despite relative displacement of said motor and said frame.

8. In a motor vehicle, the combination of a main frame having a transverse beam, a sub-frame having a transverse beam, a universal joint connecting said beams, a motor supported on said sub-frame, a motor starting-crank, and means connecting said starting-crank to said sub-frame to cause said starting-crank to remain alined with said motor despite relative displacement of said motor and said frame.

9. In a motor vehicle, the combination of a main frame having a transverse beam, a sub-frame having a transverse beam, a universal joint connecting said beams, a motor supported on said sub-frame, a motor starting-crank extending through said universal joint, and means directly supporting said starting-crank on said sub-frame to cause said starting-crank to remain alined with said motor despite relative displacement of said frames.

10. In a motor vehicle, the combination of a main frame having a transverse beam, a sub-frame having a transverse beam, a universal joint connecting said beams, a motor supported on said sub-frame, a motor starting-crank extending through said beams, and means directly supporting said starting-crank on said sub-frame to cause said starting-crank to remain alined with said motor despite relative displacement of said frames.

11. In a motor vehicle, the combination of a main frame having a transverse beam, a sub-frame having a transverse beam, a universal joint connecting said beams, a motor supported on said sub-frame, a motor starting-crank extending through said universal joint and said beams, and means directly supporting said starting-crank on said sub-frame to cause said starting-crank to remain alined with said motor despite relative displacement of said frames.

In testimony whereof, I have signed my name to this specification.

FRANS G. ALBORN.